April 4, 1961 — H. E. MILLS — 2,977,708

FISHING LURE

Filed Jan. 20, 1960

INVENTOR.
Herbert E. Mills.
BY
Balluff and McKinley
ATTORNEYS.

United States Patent Office 2,977,708
Patented Apr. 4, 1961

2,977,708

FISHING LURE

Herbert E. Mills, 5518 Bishop, Detroit, Mich.

Filed Jan. 20, 1960, Ser. No. 3,641

3 Claims. (Cl. 43—42.16)

This invention relates to fishing lures and has particular reference to a novel means for effecting a wiggling action of the lure as the same is pulled through the water. The invention also contemplates a novel and simple technique for economically securing parts to sheet metal lures.

A principal object of the invention is to provide a new and improved fishing lure.

Another object of the invention is to provide a novel means for effecting a wiggling motion of a fishing lure as the same is pulled through the water.

Other and further objects of the invention will be apparent from the following description and claims and may be understood by reference to the accompanying drawing, which by way of illustration shows a preferred embodiment of the invention and what I now consider to be the best mode of applying the principles thereof. Other embodiments of the invention may be used without departing from the scope of the present invention as set forth in the appended claims.

Figure 1:
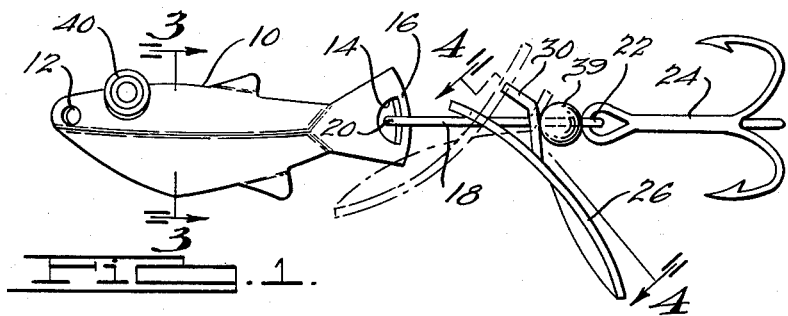
Fig. 1 is a side elevational view of a lure embodying the invention.
Figure 2:
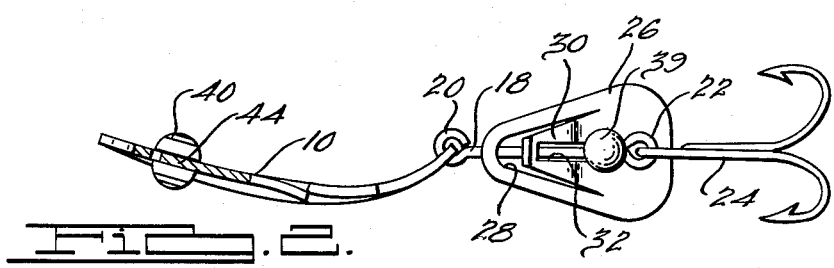
Fig. 2 is a plan view thereof with parts shown in section.
Figures 3, 5:
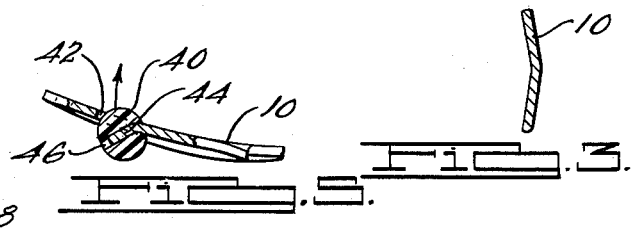
Fig. 3 is a section taken along the line 3—3 of the lure body shown in Fig. 1.
Fig. 5 is a fragmentary sectional view illustrating the technique for securing a part to a sheet metal lure.
Figure 4:
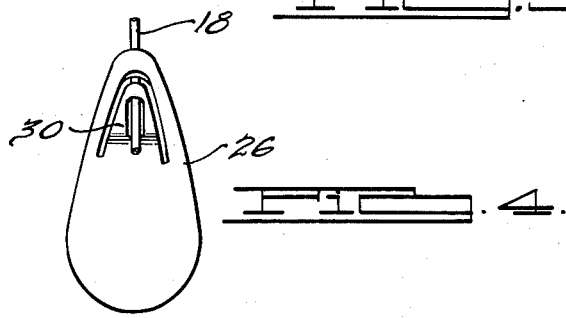
Fig. 4 is a sectional view taken along the line 4—4 of Fig. 1.

As illustrated in the drawing, the fishing lure embodying the invention comprises a sheet metal body 10 having an aperture 12 therein at the lead end thereof whereby the lure may be connected to a fishing line. The body may be dished as illustrated in Figs. 2 and 3. The tail end of the body is provided with a slot 14 forming a transverse bar 16. A link 18 is slidably swiveled at one end on the bar by means of an eye 20 through which the bar 16 extends. The other end of the link 18 is provided with an eye 22 whereby a fishhook 24 may be swiveled on the end of the link 18. A dished spinner 26, preferably formed of sheet metal, is provided with a slot 28 at one end thereof and an integral tongue 30 is formed by the material displaced from the slot which is offset from the plane of the slot and the spinner 26. The tongue is provided with a slotted aperture 32 therein at the free end thereof through which and the slot 28 the link 18 freely extends whereby the spinner 26 is free to move in a direction normal to the plane thereof as well as to rotate about the link 18. The tongue 30 projects in the direction of the slot 28, and the major portion of the spinner 26 is disposed at one side of the link 18 so as to provide an eccentric weight. Thus, as the body 10 moves through the water, the front face of the spinner which is dished and slightly twisted as indicated in Fig. 1 will rotate about the link 18. This will cause the eye 20 to shift back and forth along the bar 16 and also to exert a lateral thrust thereon so as to cause the body 10 to wiggle as it is pulled through the water by means of the line attached to the aperture 12.

Normally the spinner 26 will assume a position as shown in full lines in Figs. 1 and 2, but because of the manner in which it is mounted on the link 18 it will be free to shift to the position as shown in dotted lines in the event that the normally forwardly projecting end of the spinner 26 engages an obstruction such as a weed. In this way the spinner is not likely to become fouled or snagged on weeds and the like, as is frequently the case.

A bead 39 on the link 18 and disposed ahead of the eye 22 provides a surface for taking the thrust of the spinner 26 as it rotates as the lure moves forwardly through the water. The spinner 26, even though small, to some extent functions as a guard for the forwardly projecting barbs of the fishhook 24.

Preferably a bead 40 is mounted on the body 10 so as to provide an eye for the body which is shaped so as to simulate the form of a small fish. The bead 40 is disposed in an aperture or recess 42 and is secured therein by a tang or prong 44 which extends into a cavity or hole 46 in the bead 40. The recess 42 and tang 44 can readily be formed in the stamping operation which blanks out the body 10. After the bead 40 is mounted on the tang 44 when positioned as shown in Fig. 5 by inserting the end of the tang in the cavity 46, the tang 44 is bent back into the plane of the body so as to lock the bead 40 in the recess 42 as shown in Fig. 2. This method of securing the bead to the body 10 forms a very simple way for inexpensively enhancing the appearance of the body 10, which may be formed out of brass or any suitable sheet metal. Preferably the spinner 26 is formed out of brass or other sheet metal, but it may be formed of any other suitable material.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A fishing lure comprising a body having provisions at the lead end thereof for connecting a line thereto and a transverse bar at the tail end thereof, a link having an eye at one end through which said bar extends, and provisions at the other end for connecting a fishhook thereto, a spinner having a slot at one end thereof and an integral tongue provided by the material displaced from said slot but offset from the plane thereof, said tongue having an aperture therein at the free end thereof through which and such slot said link freely extends, whereby said spinner is free to move in a direction normal to the plane thereof, said tongue projecting in the direction of said slot, the major portion of said spinner being normally disposed at one side of said link.

2. A fishing lure comprising a body having provisions at the lead end thereof for connecting a line thereto and a transverse bar at the tail end thereof, a link slidably swiveled at one end on said bar and having provisions at the other end for connecting a fishhook thereto, a spinner having a slot therein and in integral tongue offset from the plane thereof, said tongue having an aperture therein at the free end thereof through which and such slot said link freely extends whereby said spinner is free to move in a direction normal to the plane thereof, said tongue projecting in the direction of said slot, the major portion of said spinner being normally disposed at one side of said link.

3. A fishing lure comprising a body having provisions at the lead end thereof for connecting a line thereto and a transverse bar at the tail end thereof, a link having an eye at one end through which said bar extends, a spinner having a slot therein and a tongue having an aperture therein through which and such slot said link freely extends.

References Cited in the file of this patent

UNITED STATES PATENTS

| | | |
|---|---|---|
| 1,546,673 | Poulsen | July 21, 1925 |
| 2,162,845 | Jones | June 20, 1939 |
| 2,481,445 | Premo | Sept. 6, 1949 |
| 2,507,454 | Nelson | May 9, 1950 |
| 2,777,243 | Pope | Jan. 15, 1957 |